Aug. 22, 1961  G. E. VICKERSON  2,996,746
WINDSCREEN WIPERS
Filed Oct. 1, 1958
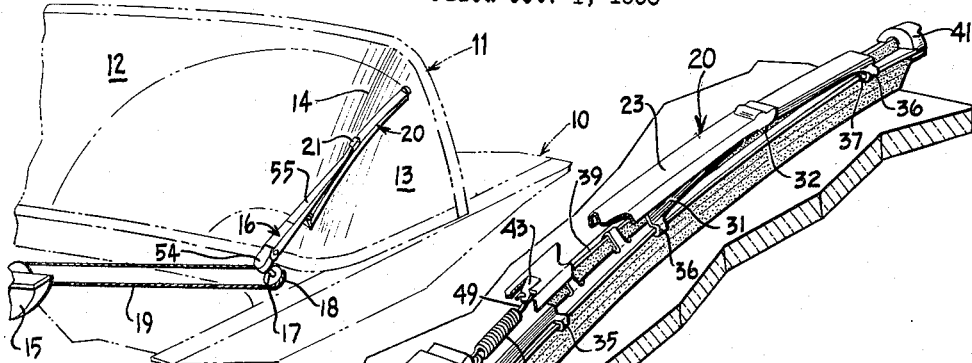
Fig. 1
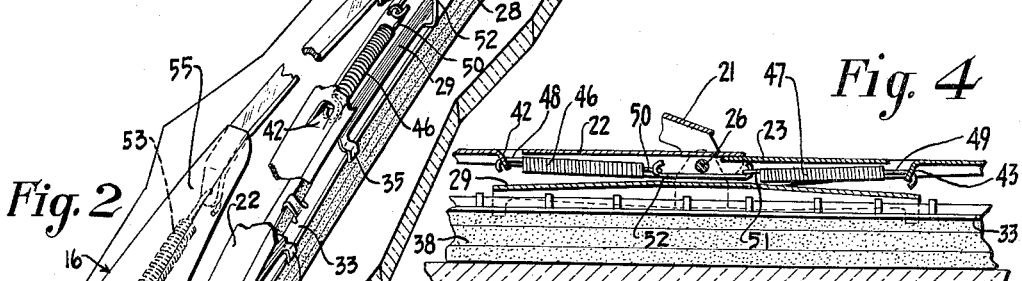
Fig. 2
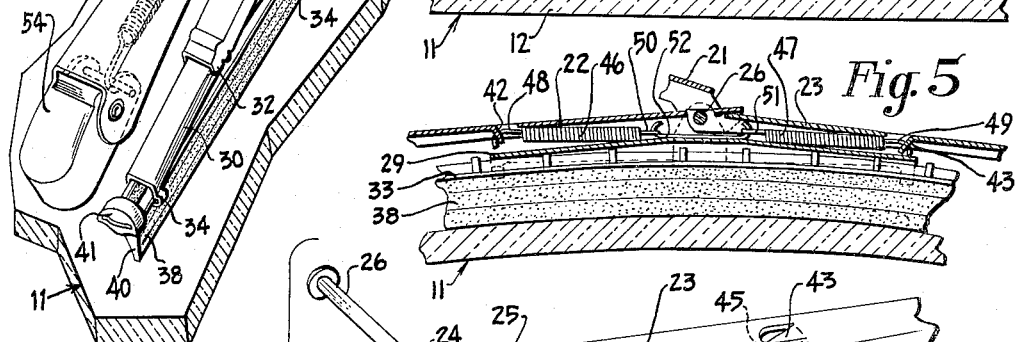
Fig. 4
Fig. 5
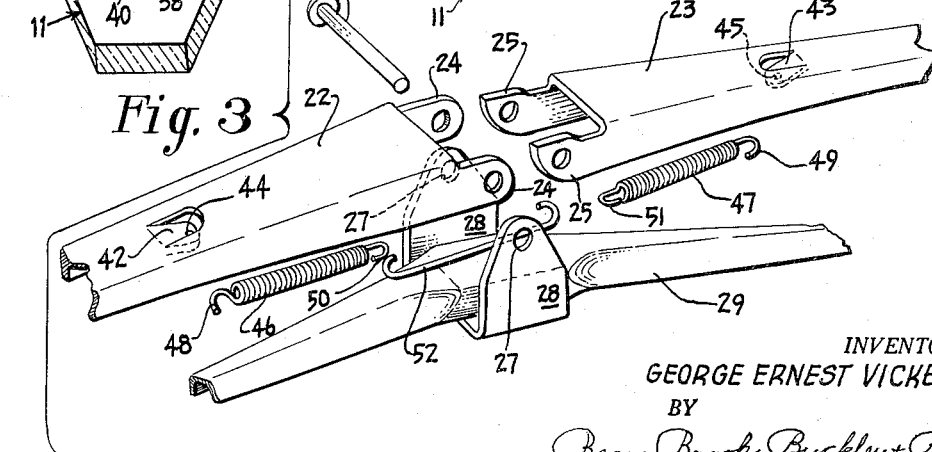
Fig. 3
INVENTOR.
GEORGE ERNEST VICKERSON
BY
Bean Brooks Buckley + Bean.
ATTORNEYS

2,996,746
WINDSCREEN WIPERS
George Ernest Vickerson, Heston, England, assignor, by mesne assignments, to Trico Products Corporation, Buffalo, N.Y., a corporation of New York
Filed Oct. 1, 1958, Ser. No. 764,664
2 Claims. (Cl. 15—250.42)

This invention relates to vehicle windshield wiper blades and more particularly to an improved wiper blade assembly for a curved windshield.

It is the primary object of the present invention to provide an improved windshield wiper blade assembly which is self-conforming to the portions of various curvature of a curved windshield, the assembly being capable of maintaining a substantially uniform wiping pressure throughout the length thereof, both on the curved and relatively straight portions of the windshield, thereby not only providing optimum wiping action but also maintaining contact with the windshield to prevent the wind from lifting the windshield wiper blade from the glass at high vehicle velocities. Other objects and attendant advantages of the present invention will readily be perceived hereafter.

The improved self-conforming windshield wiper blade assembly achieves the foregoing objects by the use of a differential acting spring construction associated with the superstructure of the wiper blade. The differential spring structure not only automatically exerts a progressively larger force tending to bias the blade to an arcuate condition as it passes from the relatively flat portions of the windshield to the more curved portions, but also exerts a progressively smaller biasing force as the blade passes from the curved to the flatter portions of the windshield. Because of this action, the blade automatically conforms to the curvature of the windshield and optimum wiping contact is thus achieved throughout its path of travel. When the wiper blade moves from the curved to the straight portion of the windshield, the action of the differential spring structure minimizes the tendency for the central portion of the wiper blade to be biased away from the windshield, thereby lessening the possibility for the formation of an airspace between the wiper element and the windshield which may provide a path for the wind, which in turn results in the wiper blade being lifted from the windshield at high vehicle velocities. Furthermore, since the windshield wiper blade will readily flex to conform to the configuration of the windshield, the requirement for excessive wiper arm pressures is obviated with the attendant increase in both wiping efficiency and blade life. The present invention will be more fully understood when the following portions of the specification are read in conjunction with the accompanying drawings wherein:

FIG. 1 is a fragmentary perspective view of an automotive vehicle mounting the improved wiper blade assembly of the present invention;

FIG. 2 is a perspective view of the improved wiper blade assembly of the present invention, portions of this figure being broken away in the interest of clarity;

FIG. 3 is a fragmentary exploded view of the differential spring structure of the improved wiper blade assembly which causes the blade to conform to both curved and straight portions of the windshield;

FIG. 4 is a fragmentary view, partially in cross-section depicting the position which the spring structure assumes when the wiper blade is on the relatively flat portion of the windshield; and, FIG. 5 is a fragmentary view, partially in cross-section, of the position which the spring structure assumes when the wiper blade is traversing a relatively curved portion of the windshield.

Reference is now made to FIG. 1 wherein a vehicle 10 is shown mounting a windshield 11 having a relatively flat frontal area 12, a lateral area 13, and a curved crest area 14. Suitably mounted at any convenient location on the vehicle is a windshield wiper motor 15 of any conventional type. A windshield wiper arm 16 is rigidly secured to rock shaft 17 which is journaled in suitable bearing structure (not shown) mounted on the cowl of the vehicle. Also mounted on rock shaft 17 is a pulley 18 which mounts cable 19 which transmits oscillatory motion from wiper motor 15 in a manner which is well known in the art. The improved windshield wiper blade assembly 20 is suitably affixed to one end of wiper arm 16 by mounting clip 21. As is well understood in the art, whenever motor 15 is in operation, wiper blade assembly 20 will oscillate back and forth in a predetermined path on the windshield to clear moisture therefrom.

It will readily be appreciated that blade assembly 20 must assume different curvatures in traversing various portions of the curved windshield. In accordance with the present invention the wiper blade assembly 20 possesses a differential acting spring construction which causes it to conform to the variously curved portions of the windshield to thereby maintain uniform wiping contact throughout the length thereof. More specifically, the spring construction exerts a progressively greater force, tending to cause the blade to assume an arcuate condition as it passes from the relatively straight to the more curved portions of the windshield and a progressively lesser force tending to cause the blade to assume an arcuate position as it moves from the curved to the relatively straight portions of the windshield. Furthermore, the conforming action of the blade is achieved without the necessity for excessive wiper arm pressure, this, in turn, resulting in both increased wiping efficiency and longer blade life.

As can be seen from FIGS. 2, 3, 4 and 5, the improved wiper blade assembly consists of primary channeled levers 22 and 23 which have apertured ears 24 and 25, respectively, extending therefrom at the central portion of the blade. A pin 26 extends through the apertures (not numbered) in aligned ears 24 and 25 and through the apertures 27 in upstanding ears 28 extending from channeled central yoke 29. Pivotally mounted on pin 26 is clip 21 which is suitably fastened to wiper arm 16. Levers 22 and 23 and pressure applying yoke 29 may pivot about pin 26 as required.

Movably mounted for limited pivotal movement at the ends of levers 22 and 23 are blade mounting yokes 30 and 31, respectively. This mounting is effected by small projections or fingers 32 extending from levers 22 and 23 about central portions of yokes 30 and 31. A flexible metal backing strip or vertebra 33 is held by fingers extending from the ends of the various yoke members. More specifically, yoke 30 has fingers 34 at the ends thereof; yoke 29 has fingers 35 at the ends thereof; and yoke 31 has fingers 36 at the ends thereof. These fingers extend about the planar side portions of vertebra 33. As can best be seen from FIG. 2, finger 36, which is closest to one end of vertebra 33 fits within notch 37 in vertebra 33 to prevent relative axial movement between yoke 31 and vertebra 33 at this point. The remainder of vertebra 33 is not notched in the vicinity of the other fingers to enable relative sliding movement between the yokes and the vertebra, this being necessary when the vertebra changes its configuration in following the curved windshield. A rubber wiper element 38 has an enlarged upper portion 39, which extends through a slot (not numbered) in vertebra 33, and a lower portion 40 which is adapted to wipe the windshield. Resilient end caps 41 are mounted on the ends of vertebra 33 to cover the exposed sharp ends thereof.

In accordance with the present invention, a differential acting spring construction is provided for biasing the above described wiper blade assembly to a curved position with a progressively greater force when it enters and traverses the more curved portions of a windshield, but which provides a progressively lesser amount of bias to the blade assembly as it enters and traverses the more straight portions of the windshield.

Portions of channeled levers 22 and 23, have projections 42 and 43 respectively formed therefrom. Projections 42 and 43 have apertures 44 and 45, respectively. The end 48 of helical spring 46 fits in aperture 44, and the end 49 of helical spring 47 fits in aperture 45 (FIG. 3). The ends 50 and 51 of springs 46 and 47, respectively, are attached to the hooked ends of clip 52, and springs 46 and 47 are always in tension.

It can readily be seen from FIGS. 4 and 5, which depict the position of the wiper blade assembly on the relatively straight and curved portions of the windshield, respectively, that the perpendicular distance from the center of pin 26 to clip 52 is greater when the wiper blade is on the curved portion of the windshield than when it is on the relatively straight portion. It will further be noted that the springs 46 and 47 stretch a relatively small amount in going from the position shown in FIG. 5 to the position shown in FIG. 4, and the tension supplied by springs 46 and 47 to the primary levers 22 and 23 is relatively constant because of this relatively insignicant change in their length. However, the differential acting spring structure does cause the wiper blade to assume its curved condition in passing from the relatively straight to the relatively curved portions of the windshield because greater forces are progressively exerted on levers 22 and 23 as the wiper element assumes a more curved condition because of the progressive increase of the lever arm through which the springs act, namely, the increase of the perpendicular distance between the center of pin 26 and clip 52 (compare FIGS. 5 and 4). The increase in curvature of the wiper element will be limited as the spring connecting clip 52 contacts with the underlying central channel, as depicted in FIG. 5. On the lesser curved contours the connecting link or clip 52 will be suspended by the terminal springs 46, 47, and as the wiper moves over the changing contour, the suspended structure will be free to float or move lengthwise of the blade and back and forth across the pivot axis 26. This action causes the windshield wiper blade to conform to the more curved portions of the windshield as it enters them from the relatively straight portions. On the other hand, as the wiper blade goes from the relatively curved portions to the relatively straight portions of the windshield, the wiper element will tend to straighten out. This is accompanied by a progressive shortening of the above noted lever arm (the perpendicular distance between pin 26 and clip 52) which, in turn, results in a progressively decreasing biasing force, thereby permitting the wiper blade to assume a relatively straight position on the relatively straight portions of the windshield without the attendant tendency for the wiper element to bow at the central portion thereof. Therefore, there is no tendency for an air space to form between the blade and the windshield to permit the wind to pass under it, thereby preventing the entire wiper blade from subsequently lifting away from the windshield.

It will further be appreciated that the wiping pressure for blade 38 is supplied by spring 53 (FIG. 2) which is mounted between the wiper arm portion 54 (which is mounted on rock shaft 17) and the pivotable portion 55 of the wiper arm (which mounts wiper blade 20). Springs 46 and 47, described above, do not materially affect the wiping pressure, but merely cause wiper blade 20 to conform to the curvature of the windshield. Thus, since the tension of spring 53 does not have to be of an extra high value to override the force of springs 46 and 47, and since the entire length of wiper element 38 is always in substantially uniform firm wiping contact with the entire portion of the windshield which it traverses because of tis self-conforming nature, the spring 53 in arm 16 may be of an optimum value which gives most efficient wiping, as well as longest blade life.

It will thus be seen that an improved windshield wiper blade assembly has been provided which, because of its self-conforming character, is capable of providing an improved wiping action on a curved windshield.

While a preferred embodiment of the present invention has been disclosed, it will readily be understood that the invention is not limited thereto, but may be otherwise embodied within the scope of the following claims.

What is claimed is:

1. A self-conforming windshield wiper blade assembly for use with a windshield having various degrees of curvature comprising a pair of primary levers, clip means adapted to be coupled to a wiper arm, a common pivot for pivotally mounting said levers and said clip means relative to each other blade mounting means affixed to said primary levers, a blade comprising a wiping element and a backing strip mounted on said blade mounting means, said wiping element carried by said backing strip, means for elevating said common pivot above said blade mounting means, tension spring means operatively coupled between said primary levers and across said pivot lying between said primary levers and said blade mounting means for exerting a relatively large biasing force tending to bias said wiper element to a curved condition about said common pivot when said wiper is on the relatively curved portion of the windshield, but exerting a relatively small force tending to bias said wiper element to a curved condition about said common pivot means when said wiper is on the relatively flat portion of the windshield, and confining means for the tension spring means acting to limit the movement of the primary levers by the biasing force.

2. A self-conforming windshield wiper blade assembly for use with a windshield having various degrees of curvature comprising a pair of primary levers, clip means adapted to be coupled to a wiper arm, a common pivot for pivotally mounting said levers and said clip means relative to each other, blade mounting means affixed to said primary levers, a blade comprising a wiping element and a backing strip mounted on said blade mounting means, said wiping element carried by said backing strip, means for elevating said common pivot above said blade mounting means, a central pressure applying yoke arranged beneath the primary levers and having upstanding ears pivoting on the common pivot, and tension spring means extending lengthwise of the levers and fastened on its opposite ends to the levers respectively, said tension spring means being confined by said ears and free to play longitudinally of the levers back and forth across the pivot axis as the wiping element conforms to the contour of the surface being wiped, said tension spring means acting to bias the wiping element toward such surface.

References Cited in the file of this patent

UNITED STATES PATENTS

| | | |
|---|---|---|
| 2,752,626 | Oishei | July 3, 1956 |
| 2,772,436 | Deibel | Dec. 4, 1956 |
| 2,876,478 | Wallis | Mar. 10, 1959 |

FOREIGN PATENTS

| | | |
|---|---|---|
| 785,865 | Great Britain | Nov. 6, 1957 |
| 795,075 | Great Britain | May 14, 1958 |
| 1,033,521 | France | Apr. 1, 1953 |